United States Patent [19]

Nitschke

[11] 4,133,667

[45] Jan. 9, 1979

[54] CONVEYOR DRIVE MECHANISM FOR A GLASS SHEET MANUFACTURING SYSTEM

[76] Inventor: John S. Nitschke, 324 E. Second, Perrysburg, Ohio 43551

[21] Appl. No.: 888,073

[22] Filed: Mar. 20, 1978

[51] Int. Cl.² ............................................. C03B 27/00
[52] U.S. Cl. ...................................... 65/163; 65/348; 198/790; 198/832; 198/835; 271/198; 271/275
[58] Field of Search ................. 65/163, 348, 349, 350, 65/351; 271/198, 275; 198/789, 790, 835, 832

[56] References Cited

U.S. PATENT DOCUMENTS

| | | | |
|---|---|---|---|
| 1,856,669 | 5/1932 | Sylvester | 65/349 X |
| 2,140,282 | 12/1938 | Drake | 65/349 |
| 3,371,835 | 3/1968 | Pendleton | 226/50 |
| 3,457,057 | 7/1969 | Gardon | 65/351 X |
| 3,840,109 | 10/1974 | Kohl | 198/789 |
| 3,994,711 | 11/1976 | McMaster | 65/349 X |

Primary Examiner—Arthur D. Kellogg

Attorney, Agent, or Firm—Reising, Ethington, Barnard, Perry & Brooks

[57] ABSTRACT

A conveyor drive mechanism for a glass manufacturing apparatus transports a glass sheet through a glass processing station. The conveyor drive mechanism includes first and second conveyor drives disposed on opposed lateral sides of the station. Each of the conveyor drives includes first and second pulleys and a continuous drive loop trained thereover. The glass plate is supported on a plurality of elongate rollers that extend between the conveyor drives and have their opposed ends supported on and in frictional engagement with the continuous drive loops. A first torque source applies drive torque to the first pulleys, and a second counter-torque source applies a counter-torque to the second pulleys. The cooperative effect of the first and second sources provides at least a minimum, predetermined level of tension in the active areas of the continuous drive loops at all times. A control circuit for controlling the energization of the first torque source and second counter-torque source is disclosed.

33 Claims, 5 Drawing Figures

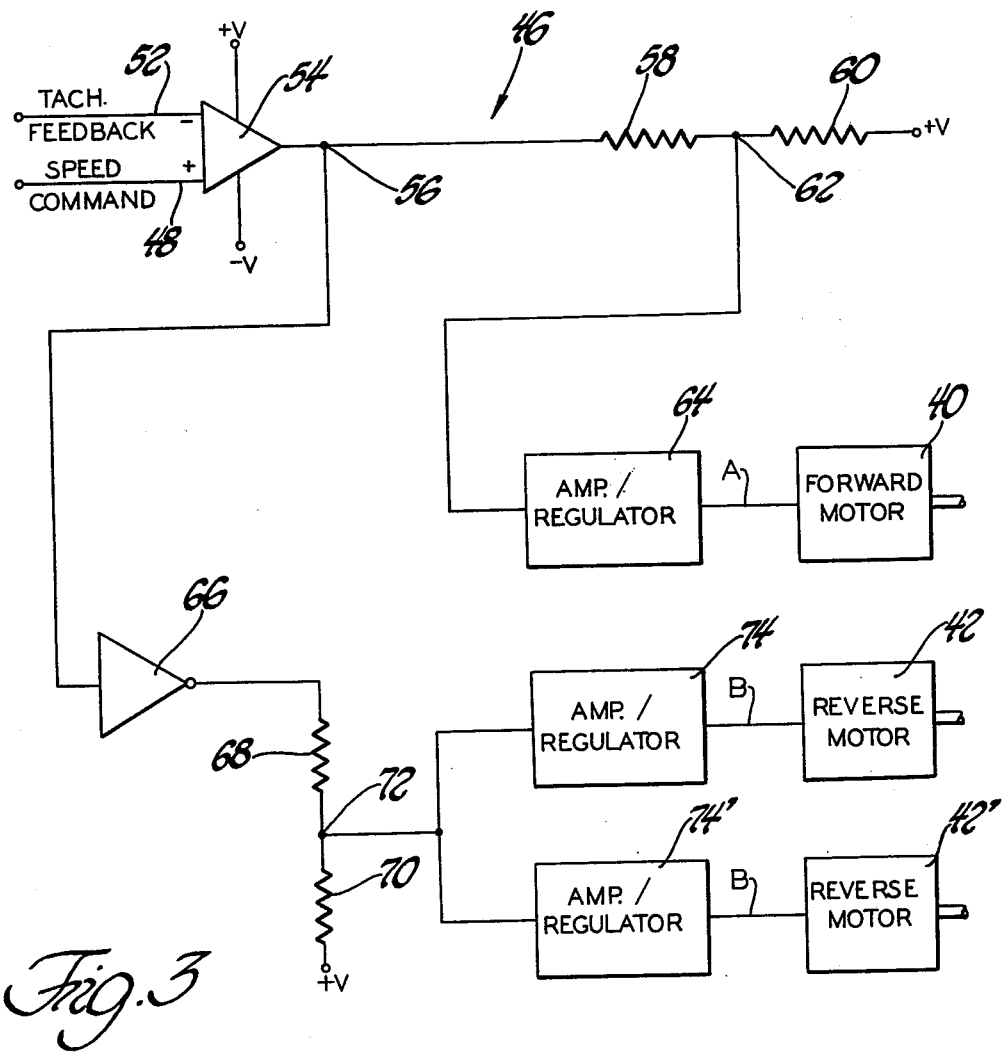

CONVEYOR DRIVE MECHANISM FOR A GLASS SHEET MANUFACTURING SYSTEM

TECHNICAL FIELD

The present invention relates to glass manufacturing apparatus, and more particularly to a conveyor drive mechanism for use in such manufacturing apparatus.

BACKGROUND OF THE INVENTION

The glass manufacturing process generally takes place through a succession of related steps that are carried out at separate stations in an overall glass furnace; each of the stations generally has correspondence to one of the manufacturing steps. More specifically, the usual glass manufacturing process includes the steps of drawing a sheet of glass from a bath of molten glass, conveying the molten glass sheet through an annealing furnace with a decreasing temperature gradient over its length that allows the sheet to cool slowly to prevent the buildup of compressive forces within the glass; cutting the annealed glass sheet to the shape and size desired; and tempering the cut sheet by a heating and sudden cooling process to give the glass sheets high compressive forces at their surfaces to minimize susceptibility to breakage and shattering.

The glass material must be conveyed through each of the successive stations at a controlled rate. One known means for conveying the glass sheets between and within a station is to provide each station with a conveyor mechanism defined by a pair of cooperative conveyor drives spaced apart from one another at opposite sides of the station; each of the conveyor drives being defined by a continuous drive loop framed over a pair of cooperative pulleys. A plurality of elongate, cylindrical rollers are spaced apart from one another with respect to the direction of glass movement, and have their opposed ends supported on the respective conveyor drives in frictional engagement therewith. The cooperative rotation of the conveyor drives imparts rotational motion to the rollers. A glass sheet carried on the rollers will be transported through the station in accordance with the net driving torque applied to the conveyor drives.

In an earlier practical design of a glass conveyor mechanism of this type, predating the glass conveyor mechanism of the present invention, the continuous drive loop of each conveyor drive was defined by an endless steel band. The band was formed from a long strip of stainless steel having a thickness of approximately 1/16 inch. The stainless steel strip was made into a loop by welding the opposed ends together to form a smooth seam. This form of continuous drive loop required special design attention and periodic maintenance. Specifically, the use of the band in a relatively long station that required high levels of driving torque to transport the glass through the station, caused relatively high tension in the band as it passed over the conveyor drive pulley. In addition, relatively large, special pulleys were needed to drive the band to minimize metal fatigue caused by the bending of the band when it conformed to the shape of the conveyor pulleys. Maintenance of this drive system included the rewelding of a belt that became separated at the seam, and periodic replacement. Experience with such drive systems provided the stimulus for the improved conveyor mechanism of the present invention.

More factually, a Model F-400 furnace built by Glasstech, Inc. and which employed the earlier endless, stainless steel band drive loop was placed in a commercial installation in February of 1974. In May of 1974, the stainless steel band drive loop of that furnace was replaced by an alternative drive loop design. First the stainless steel band and flat pulley arrangement were replaced by a flat-top steel drive chain and sprocketed pulley arrangement. This design change revealed a characteristic peculiar to the chain drive loop. Specifically, when the chain was being accelerated or decelerated through the range of zero to one-third of its normal operating speed, it would vibrate. These vibrations were traced to the slip-stick friction phenomenon that frequently occurs in mechanical drive systems. More precisely, the chain was experiencing a transition between the effects of static friction and kinetic friction in this low speed range, i.e. one chain link may be subject to static frictional effects, while at the same time another chain link may be subject to kinetic frictional effects. The slip-stick friction phenomenon manifests itself as vibration in the moving chain. However, because the vibratory effects were only present when the chain was being driven at below one-third the normal chain velocity, they did not prohibit the use of the chain design.

Another characteristic of the chain drive design came to light when observing the operation of a Model F-501 furnace that was installed at a site in August, 1975. A Model F-501 is an oscillating roller-hearth furnace that oscillates a glass sheet load within the furnace by alternately driving the chain sprocket forward and backward in contrast to the Model F-400 which is a continuous motion furnace. With each reversal in the driving torque applied to the drive sprocket there would be an appreciable amount of lost motion caused by the slack present in the drive chain. This lost motion effect would allow the rollers to be momentarily stopped even though the sprocket driving the chain was moving smoothly.

At this juncture changes were explored to modify the chain drive design in such a manner that the vibration and lost motion would be eliminated.

Under the design developed, as will hereinafter be more fully set forth in the Disclosure of the Invention and Best Mode for Carrying out the Invention, a minimum level of tension is maintained on the active area of the chain irrespective of the direction of chain travel. This broad idea was implemented on an experimental basis in a Model F-502 furnace installed in June, 1976 in Toledo, Ohio and incorporated as a standard feature on a Model F-503 furnace installed in July 1977 in South Africa. The experimentation begun in June, 1976, culminated in the improved conveyor mechanism design forming the subject of this patent application.

DISCLOSURE OF THE INVENTION

The present invention relates to a conveyor mechanism for a glass manufacturing apparatus. The conveyor system provides smooth transport of a glass sheet load through a processing station free of vibrational or lost motion effects.

Broadly, the invention contemplates a glass conveyor mechanism comprising a pair of cooperative conveyor drives. Each conveyor drive is positioned along one lateral side of the station and includes a pair of pulleys that are interconnected by a continuous drive loop. In the preferred embodiment, each continuous drive loop is formed by an endless steel drive chain trained over two complementary sprockets. The glass sheet being transported is carried by a plurality of elongate, cylindrical rollers. The rollers are spaced apart from one another with respect to the direction of glass travel, and each of the rollers has its opposed ends supported by and in frictional engagement with the continuous drive loops. A sheet of glass is transported by the conveyor system by applying a drive torque to one of the pulleys of each of the pair of conveyor drives. The rotational motion of the pulleys causes the continuous drive loop to rotate, which, in turn, imparts motion to the rollers through the frictional relation between the rollers and drive loop.

In accordance with the present invention, the two respective pulleys not having the drive torque applied to them, receive a controlled amount of counter torque to provide a minimum level of tension in each of the continuous drive loops. In the preferred embodiment, where the continuous drive loop is an endless drive chain, the minimum tension prevents the occurrence of low speed vibration and lost motion upon a change in the direction of the driving torque. In the case of an oscillating conveyor system, the preferred mechanism for providing oscillating motion is a pair of counterpoised motors, each motor applying a controlled counter torque to the other while the other is driving the conveyor drive. In the case of a continuous conveyor system, the counter-torque mechanism could be a counter-poised motor or a retarder, such as a hydraulic brake. The energization of the counter-torque mechanism is controlled by a control circuit which includes a servo-control loop that performs a comparison of a transport command signal with a motor speed feedback signal.

Other advantages of the present invention will be readily appreciated as the same becomes better understood by reference to the following detailed description when considered in connection with the accompanying drawings.

BRIEF DESCRIPTION OF DRAWINGS

FIG. 3 is a schematic representation of the speed control circuit of FIG. 2; and FIGS. 4A and B are tables illustrating two alternative torque counter-torque relationships for driving an oscillating conveyor mechanism in accordance with the present invention.

BEST MODE FOR CARRYING OUT THE INVENTION

Figure 1:
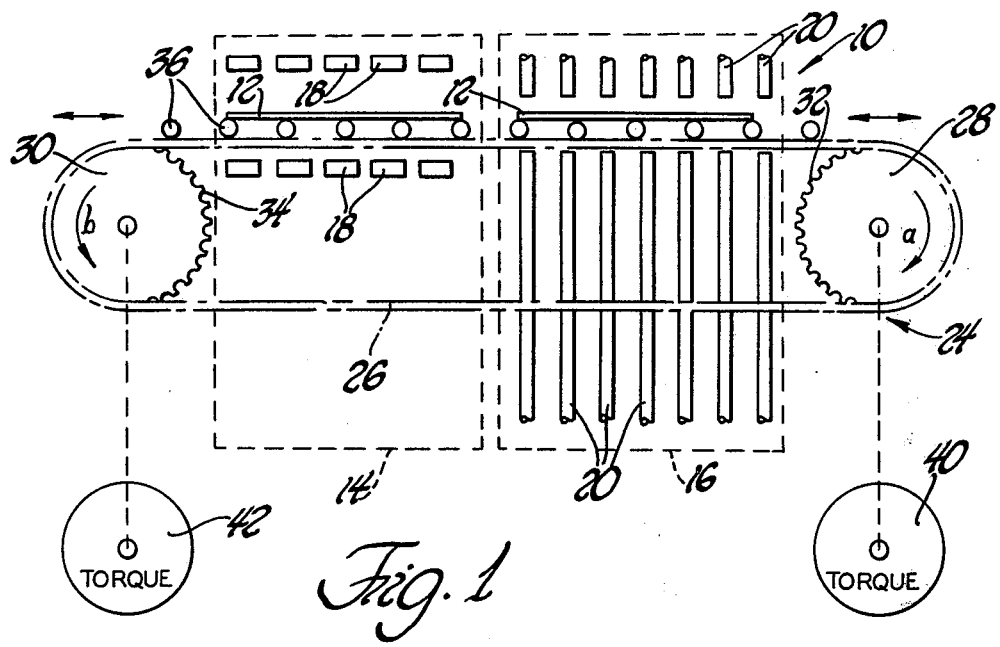
FIG. 1 is a schematic model of a glass processing station having a conveyor drive mechanism incorporating the present invention.

FIG. 1 schematically illustrates a glass tempering station 10 in a glass manufacturing apparatus. The tempering station 10 is selected as representative of any of a number of different stations in the glass manufacturing apparatus that employ a conveyor drive mechanism for the transport of a glass sheet load through the station. The tempering station 10 includes two distinct stages, a furnace stage 14 and a quench state 16, each of which performs cooperative functions in the overall glass tempering process.

Broadly, the tempering step can be divided into two basic sub-steps. First, a glass sheet that is to undergo tempering is subjected to heat from a plurality of heating elements 18 in the furnace stage 14 in order to raise the temperature of the glass plate 12 to a relatively high level. In the second sub-step, the heated glass plate 12 is subjected to a flow of cooling air on both of its sides from a plurality of air nozzles 20 in the quench stage 16. In general, the heating and rapid cooling of the glass plate 12 causes high compressive forces to exist at the outer surfaces of the sheet to minimize its susceptibility to breakage and shattering. A more detailed understanding of the tempering process can be obtained from a reading of the patent to Harold McMaster, U.S. Pat. No. 3,994,711, issued Nov. 30, 1976, whose teachings are herein incorporated by reference.

The tempering station 10 includes a conveyor drive, generally illustrated at 24. The conveyor drive, which as will hereinafter be explained cooperates with a second, like conveyor drive disposed at the opposite lateral side of the station 10, includes a continuous drive loop 26 trained over first and second pulleys 28 and 30 spaced apart from one another along the direction of glass travel indicated by the bidirectional arrows. In the preferred embodiment, the continuous drive loop 26 comprises an endless drive chain, and the first and second pulleys 28 and 30 have teeth 32 and 34 formed about their periphery to define sprockets. The endless drive chain may, for example, be 3" wide, ¾" pitch steel timing chain which is commercially available from Morse Power Company.

A glass plate support bed is defined by a plurality of elongate, cylindrical rollers 36 of the type shown in the previously referenced U.S. Pat. No. 3,994,711. The rollers 36 are preferably formed of fused quartz and are spaced from one another along the direction of travel indicated by the bidirectional arrows, and extend laterally with respect thereto. The opposed end portions of the rollers 36 are supported by and in frictional engagement with the active area of the continuous drive loop 26. It will be appreciated that rotational motion of the continuous drive loop 26 imparts motion to each of the elongate rollers 36 through the frictional engagement therebetween. The underside of the active area of the drive chain 26 may ride over a wear plate, which is not shown in the view for simplicity of illustration.

The conveyor drive 24 is driven by a first torque source 40. The torque source 40 is coupled to the sprocket 28 to rotationally drive the sprocket in the direction indicated by arrow a. The preferred form for the torque source 40 is a DC drive motor.

A second torque source 42 is coupled to the other sprocket 30 to provide a counter torque to the torque applied by source 40. In the case of a continuous drive furnace, the second torque source 42 may be a counterpoised DC drive motor, or a passive retarder device, such as a frictional brake. The second torque source will assert a counter-torque in the direction of arrow b. The basic function of the counter-torque approach is to maintain a minimum level of tension in the active area of the continuous drive loop 26 to prevent vibration and lost motion.

Figure 2:
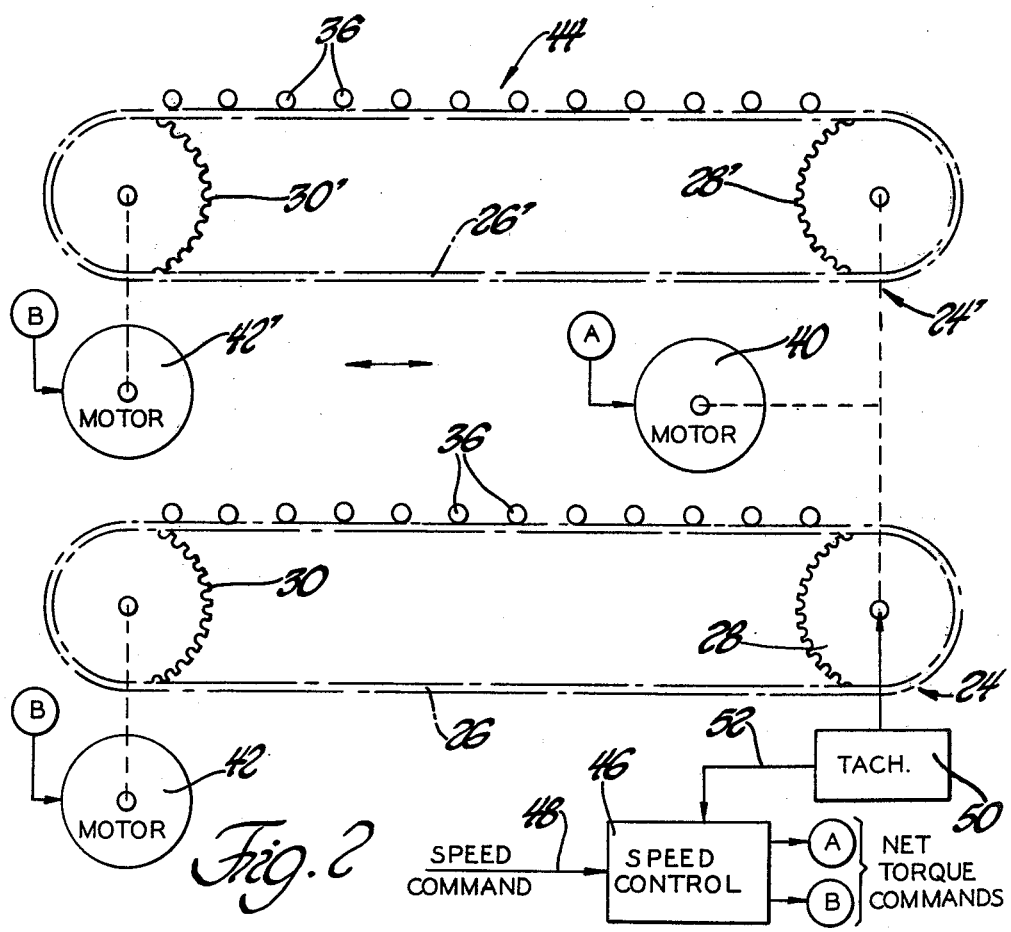
FIG. 2 is a schematic model of an oscillating conveyor mechanism in accordance with FIG. 1 that more fully details the present invention.

Reference is now made to FIG. 2, which shows an oscillating conveyor mechanism 44 in greater schematic detail. The conveyor mechanism 44 includes a first conveyor drive 24, as was shown in FIG. 1, and a second, cooperative conveyor drive 24'. In the glass tempering station represented in FIG. 1, the first conveyor drive 24 would be disposed at one lateral side of the station with its longitudinal axis parallel to the direction of glass travel, as indicated by the bidirectional arrow, and the second conveyor drive 24 disposed on the opposite lateral side of the station with its longitudinal axis similarly parallel to the direction of glass travel. The second conveyor drive 24' is in all essential respects similar to the first conveyor drive 24. As was earlier mentioned, the elongate rollers 36 extend between the first and second conveyor drives 24 and 24' and have their end portions supported on and in frictional engagement with the active areas of the continuous drive loops 26 and 26'. In the schematic representation of FIG. 2, only the end faces of the elongate rollers 36 are shown for simplicity of illustration.

In the preferred form of the oscillating conveyor drive mechanism 44, the first torque source takes the form of a drive motor 40. The sprockets 28 and 28' are commonly coupled to the output shaft of the motor 40 for simultaneous driving. The drive motor 40 is energized by a first control signal A that represents the net torque command for the motor.

The second torque source preferably comprises a pair of first and second motors 42 and 42'. Each of the motors 42 and 42' is counter-poised with respect to motor 40, and is separately coupled to respective sprockets 30 and 30'. The counter-poised motors 42 and 42' are each energized by a second control signal B that represents the net torque command for each of the pair of motors.

The advantage of using a counter-poised motor or motors as the second, counter-torque source lies in its adaptability for use where an oscillating conveyor drive mechanism is required. In this case, the first torque source 40 and second, counter-torque source 42 can be alternately energized with a predetermined relationship to one another to oscillate a glass sheet load within the associated station, and at all times maintain a minimum, predetermined level of tension in the active area of the continuous drive loops to prevent slip-stick friction and lost motion effects.

FIGS. 4A and B are tables illustrating two different possible relationships between the torque applied to the first and second torque sources in an oscillating conveyor drive mechanism.

Table 4A is the preferred torque relationship. The left-most column lists five representative torque requirements for driving the conveyor drive mechanism 44 through its full range of speeds. With a 100% torque requirement, the torque applied by the first torque source 40 is 100% of its rated value and the torque applied by the second, counter-torque source 42 is zero. With 50% net torque requirement, the torque applied by the first torque source 40 is 75% of its rated value, and the counter-torque applied by the second, counter-torque source 42 is 25% of its rated value. With a zero net torque requirement condition, the torque applied by both the first and second sources 40 and 42 is one-half of the rated value of each. The same pattern holds for the corresponding negative torque requirements, as may be understood by an inspection of the fourth and fifth rows of FIG. 4A.

FIG. 4B is a table showing an alternative torque relationship between the first and second torque sources. In this case, when the maximum available torque is required, the first torque source applies 100% of its rated value, and the second, counter-torque source applies 20% of its rated value. With a torque requirement of 50% of the available torque, the first torque applies 80% of its rated value and the second, counter-torque source applies 40% of its rated value. With a zero torque requirement, both the first and second sources apply 60% of their rated values. It will be understood from an inspection of the fourth and fifth rows of FIG. 4B that the same pattern holds for the corresponding negative torque requirements.

Referring again to FIG. 2, the first torque source 40 and second counter-torque source 42, 42', are energized by respective first and second control signals A and B. Each of the control signals represents a net torque requirement for the first and second sources and is output from a speed control circuit 46. The speed control circuit 46 has as one input a speed command 48 that represents the speed at which the glass plate is to be transported by the conveyor drive mechanism 44, and has as a second input the output signal from a tachometer 50 that senses the rotational velocity of the sprocket 28. The speed control circuit 46 is shown in greater detail in FIG. 3, to which reference is now made.

The speed control circuit 46 includes a comparator 54 having an asserted input 48 and a negatived input 52. The comparator 54 has control voltages $+V$ and $-V$ applied thereto which represent the upper and lower bounds of the comparator output signal, respectively. The asserted input 48 receives the speed command signal, and the negatived input 52 receives the tachometer feedback signal. The output of the comparator 54 is a difference signal related to the difference in value between the speed command and tachometer feedback signals.

The comparator output signal at node 56 is applied to a first control channel having a voltage divider network defined by the serial connection of resistors 58 and 60. The common terminals of resistors 58 and 60 define an output node 62. The other terminal of resistor 60 is held at the reference voltage level $+V$. The signal appearing at node 62 is applied to an amplifier/regulator 64 that amplifies and regulates the input signal. The output of the amplifier/regulator 64 is the first control signal A which is applied to the forward motor 40.

The signal at node 56 is also applied to a second control channel whose function it is to develop the second control signal B to energize the motors 42 and 42'. The second control channel includes an inverter 66 that receives as input the signal at node 56 and produces as output an inverted representation of the same. The output signal from inverter 66 is applied to a resistive voltage divider network defined by the serial connection of resistors 68 and 70. The common terminals of resistors 68 and 70 define an output note 72. The other terminal of resistor 70 is held at the reference voltage $+V$. The signal appearing at node 72 is applied to two parallel signal paths. One of the paths includes an amplifier/regulator 74 and amplifies and regulates the input signal. The output of the amplifier/regulator 74 is second control signal B which energizes the reverse motor 42. The other signal path includes a like amplifier/regulator 74' that amplifies and regulates its input signal. The output of amplifier/regulator 74' is again the second control signal B which energizes the reverse motor 42'. Three representative examples of the operation of the speed control circuit in accordance with the torque relationship set forth in FIG. 4A will next be given.

First, is the condition where the speed command signal represents a 100% torque requirement with the conveyor drive mechanism 44 motionless. In this instance, the difference between the signal values at the asserted input 48 and negatived input 52 will be at a maximum. Accordingly, the difference signal appearing at node 56 will be equal to +V, i.e. the upper bound value of the comparator output. The signal value at node 62 will likewise be equal to +V. Accordingly, the first control signal A will likewise attain its maximum value and energize the forward motor 40 for maximum torque output.

The +V signal value at node 56 will be received by the inverter 66 and the output as a negative signal of the same magnitude. Accordingly, the voltage at node 72 will be proportional to the ratio of the ohmic values of resistors 68 and 70. When the torque relationships of FIG. 4A are used, the ohmic values of resistors 58 and 60 are selected to be equal, and the ohmic values of resistors 68 and 70 are likewise selected to be equal. Therefore, the voltage appearing at node 72 is zero. This corresponds to a second control signal B of zero and no energization of the reverse motors 42 and 42'. This is in agreement with the first row of FIG. 4A.

In the second illustrative situation, the net torque requirement is zero. This corresponds to a condition where the signal values appearing on inputs 48 and 50 are equal. Accordingly, the difference signal appearing at node 58 is zero. The signal value appearing at node 62 will therefore be equal to +0.5V, i.e. one-half of the maximum value. The first control signal A will correspondingly appear as one-half of its maximum value.

The signal value appearing at node 72 will likewise be equal to +0.5V. Moreover, the second control signal B will similarly assume one-half of its maximum value. This is in agreement with the third line of FIG. 4A.

In the third situation, the torque requirement is 100% in the reverse direction with the conveyor drive mechanism 44 motionless. In this instance, the difference signal appearing at node 66 will be equal to −V, i.e. the lower bound of its permissible values. Accordingly, the signal value appearing at node 62 will be zero, and the first control signal A will correspondingly have a zero value.

The −V difference signal at node 56 will be inverted into a positive signal of the same magnitude by the inverter 66. Accordingly, the signal value appearing at node 72 will be equal to +V, i.e. the maximum value. Correspondingly, the second control signal B will also attain its maximum value. This is in agreement with the fifth line of FIG. 4A.

The speed control circuit 46 can be modified to obtain the torque relationships specified in FIG. 4B by modifying the ratio of the ohmic values of the voltage divider networks of the first and second control channels. In fact, any desired torque relationship can be established by proper selection of the ratio of ohmic values of the resistors in the voltage divider networks of the first and second control channels.

The invention has been described in an illustrative manner, and it is to be understood that the terminology which has been used is intended to be in the nature of words and description rather than of limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A conveyor drive system for transporting a sheet glass load through a glass processing station along a direction of travel comprising:
   a conveyor drive defined by at least one continuous drive loop trained over first and second pulleys mounted at opposed ends of a lateral side of the processing station;
   a plurality of elongate rollers spaced apart from one another along the direction of travel and extending transversely with respect thereto, the plurality of rollers being in driving engagement with the conveyor drive for rotational motion upon motion of the continuous drive loop;
   first torque means, coupled to the first pulley of the conveyor drive and responsive to a first control signal, for applying a drive torque to the first pulley in accordance with the first control signal;
   second torque means, associated with the second pulley of the conveyor drive, for applying a counter-drive torque to the second pulley; and
   control means, responsive to a transport speed command signal, for providing the first control signal to drive the first pulley in accordance with the transport speed command while at all times maintaining a minimum predetermined level of tension in the continuous drive loop.

2. The conveyor drive system as defined in claim 1, wherein each of the plurality of elongated rollers is in frictional engagement with the continuous drive loop.

3. The conveyor drive mechanism as defined in claim 1 wherein,
   the second torque means is further defined to be responsive to a second control signal for applying the counter-drive torque in accordance therewith, and
   the control signal means is further defined to provide both the first and second control signals to drive the conveyor drive in accordance with the transport speed command.

4. The conveyor drive system as defined in claim 3, wherein the first torque means includes a drive motor and the second torque means includes a counterpoised drive motor.

5. The conveyor drive system as defined in claim 3, further comprising sensor means associated with the first torque means for producing a feedback signal representative of the rotational speed of the first pulley.

6. The conveyor drive system as defined in claim 5, wherein the control means is further defined to include,
   comparator means, having a first input receiving the transport speed command signal and a second input receiving the feedback signal, for comparing the received signal inputs to produce a difference signal,
   a first control channel responsive to the difference signal to produce the first control signal as a function of the difference signal, and
   a second control channel responsive to the difference signal to produce the second control signal as a function of the difference signal.

7. The conveyor drive system as defined in claim 6, wherein the first control channel includes signal scaling means for producing a scaled representation of the difference signal, and the second control channel includes signal inversion-scaling means for producing a scaled, inverted representation of the difference signal.

8. The conveyor drive system as defined in claim 7, wherein the signal scaling means comprises a resistive voltage divider network, and the signal inversion-scaling means comprises an inverter coupled to a resistive voltage divider network.

9. The conveyor drive system as defined in claim 5, wherein the sensor means comprises a tachometer.

10. The conveyor drive system as defined in claim 1, wherein the conveyor drive is defined by first and second continuous drive loops each trained over respective sets of first and second pulleys, each of the continuous drive loops being disposed at opposed lateral sides of the processing station in cooperative relation to one another.

11. The conveyor drive system as defined in claim 1, wherein the continuous drive loop comprises an endless drive chain, and the pulleys are toothed at their periphery to engage the drive chain.

12. The conveyor drive system as defined in claim 1, wherein each of the rollers has an elongate cylindrical form and is formed of fuzed quartz.

13. A conveyor drive system for transporting a sheet glass load through a glass processing station along a direction of travel comprising:
    first and second cooperative conveyor drives, each of the conveyor drives defined by a continuous drive loop trained on first and second pulleys spaced apart along the direction of travel, each of the conveyor drives being disposed at opposed lateral sides of the processing station in cooperative relation to one another;
    a plurality of elongate rollers spaced apart from one another along the direction of travel and extending transversely with respect thereto, each of the rollers having its opposed ends supported by and in frictional engagement with the continuous drive loops of the first and second conveyor drives;
    first torque means coupled to the first pulleys of each of the conveyor drives and responsive to a first control signal, for applying a drive torque to each of the first pulleys in accordance with the first control signal;
    second torque means associated with the second pulleys of each of the conveyor drives and responsive to a second control signal for applying a counter-drive torque to each of the second pulleys in accordance with the second control signal; and
    control means, responsive to a transport speed command signal, for providing the first and second control signals to drive the first and second conveyor drive mechanism in accordance with the speed control command while at all times maintaining a minimum predetermined level of tension in the continuous drive loop.

14. The conveyor drive system as defined in claim 13, wherein the first torque means includes a drive motor and the second torque means includes a counterpoised drive motor.

15. The conveyor drive system as defined in claim 13, wherein the continuous drive loop comprises an endless drive chain, and the pulleys are toothed at their periphery to engage the drive chain.

16. The conveyor drive system as defined in claim 13, wherein each of the rollers has an elongate cylindrical form and is formed of fuzed quartz.

17. The conveyor drive system as defined in claim 13, further comprising sensor means associated with the first torque means for producing a feedback signal representative of the rotational speed of the first pulleys.

18. The conveyor drive system as defined in claim 17, wherein the control means is further defined to include, comparator means, having a first input receiving the transport speed command signal and a second input receiving the feedback signal, for comparing the received signal inputs to produce a difference signal,
    a first control channel responsive to the difference signal to produce the first control signal as a function of the difference signal, and
    a second control channel responsive to the difference signal to produce the second control signal as a function of the difference signal.

19. The conveyor drive system as defined in claim 18, wherein the first control channel includes signal scaling means for producing a scaled representation of the difference signal, and the second control channel includes signal inversion-scaling means for producing a scaled, inverted representation of the difference signal.

20. The conveyor drive system as defined in claim 15, wherein the signal scaling means comprises a resistive voltage divider network, and the signal inversion-scaling means comprises an inverter coupled to a resistive voltage divider network.

21. The conveyor drive system as defined in claim 17, wherein the sensor means comprises a tachometer.

22. In a glass sheet conveyor system for a glass processing station of the type having a conveyor drive defined by at least one continuous drive loop trained over first and second spaced pulleys, mounted at opposed ends of a lateral side of the processing station; a glass sheet transport bed defined by a plurality of elongate rollers, the plurality of rollers being in driving engagement with the continuous drive loop; and torque means for applying torque to the first pulley of the conveyor drive; the improvement comprising:
    counter-torque means for applying a counter-torque to the second pulley of the conveyor drive, which, in cooperation with the torque means, maintains a minimum, predetermined level of torque on the area of the continuous drive loop in engagement with the plurality of elongate rollers.

23. In a glass tempering furnace of the type having a roller hearth defined by a plurality of spaced, elongated rollers disposed transversely with respect to the direction of glass travel through the furnace, each roller having at least one end in driving engagement with a continuous drive loop trained over first and second pulleys mounted in spaced relation on one side of the furnace, an improved conveyor drive system comprising:
    first torque means, coupled to the first pulley and responsive to a first control signal, for applying a drive torque to the first pulley in accordance with the first control signal;
    second torque means, associated with the second pulley, for applying a counter-drive torque to the second pulley; and
    control means, responsive to a transport speed command signal, for providing the first control signal to drive the first pulley in accordance with the transport speed command while at all times maintaining a predetermined level of tension in the continuous drive loop.

24. The glass tempering furnace as defined in claim 23, wherein each of the plurality of elongated rollers is in frictional engagement with the continuous drive loop.

25. The glass tempering furnace as defined in claim 23, wherein, the second torque means is further defined to be responsive to a second control signal for applying the counter-drive torque in accordance therewith, and the control signal means is further defined to provide both the first and second control signals to drive the continuous drive loop in accordance with the transport speed command.

26. The glass tempering furnace as defined in claim 25, wherein the first torque means includes a drive motor and the second torque means includes a counterpoised drive motor.

27. The glass tempering furnace as defined in claim 25, further comprising sensor means associated with the first torque means for producing a feedback signal representative of the rotational speed of the first pulley.

28. The glass tempering furnace as defined in claim 27, wherein the control means is further defined to include, comparator means, having a first input receiving the transport speed command signal and a second input receiving the feedback signal, for comparing the received signal inputs to produce a difference signal, a first control channel responsive to the difference signal to produce the first control signal as a function of the difference signal, and a second control channel responsive to the difference signal to produce the second control signal as a function of the difference signal.

29. The glass tempering furnace as defined in claim 28, wherein the first control channel includes signal scaling means for producing a scaled representation of the difference signal, and the second control channel includes signal inversion-scaling means for producing a scaled, inverted representation of the difference signal.

30. The glass tempering furnace as defined in claim 29, wherein the signal scaling means comprises a resistive voltage divider network, and the signal inversion-scaling means comprises an inverter coupled to a resistive voltage divider network.

31. The glass tempering furnace as defined in claim 27, wherein the sensor means comprises a tachometer.

32. The glass tempering furnace as defined in claim 23, wherein the continuous drive loop comprises an endless drive chain, and the pulleys are toothed at their periphery to engage the drive chain.

33. The glass tempering furnace as defined in claim 23, wherein each of the rollers has an elongate cylindrical form and is formed of fuzed quartz.

* * * * *